United States Patent
Zheng et al.

(10) Patent No.: US 12,224,787 B1
(45) Date of Patent: Feb. 11, 2025

(54) PROTECTIVE CASE FOR ELECTRONIC DEVICE

(71) Applicant: Shenzhen Lingyi Innovation Technology Co. Ltd, Shenzhen (CN)

(72) Inventors: Yanghui Zheng, Shenzhen (CN); Qiushun Liu, Shenzhen (CN)

(73) Assignee: Shenzhen Lingyi Innovation Technology Co. Ltd, Shenzhen (CN)

( * ) Notice: Subject to any disclaimer, the term of this patent is extended or adjusted under 35 U.S.C. 154(b) by 0 days.

(21) Appl. No.: 18/625,302

(22) Filed: Apr. 3, 2024

(30) Foreign Application Priority Data

Sep. 7, 2023 (CN) .......................... 202311152026.3

(51) Int. Cl.
*H04B 1/3888* (2015.01)
*H04M 1/02* (2006.01)

(52) U.S. Cl.
CPC ........ *H04B 1/3888* (2013.01); *H04M 1/0283* (2013.01)

(58) Field of Classification Search
CPC ............................ H04B 1/3888; H04M 1/0283
See application file for complete search history.

(56) References Cited

U.S. PATENT DOCUMENTS

| | | | |
|---|---|---|---|
| 9,831,905 B1 * | 11/2017 | Flores | H05K 5/0004 |
| 9,960,630 B2 * | 5/2018 | Jang | H02J 7/0044 |
| 9,968,169 B1 * | 5/2018 | Pelton | H04B 1/3888 |
| 12,005,656 B2 * | 6/2024 | Zheng | A45C 11/00 |
| 2009/0189818 A1 | 7/2009 | Yang et al. | |
| 2011/0073358 A1 * | 3/2011 | Hayashi | H05K 3/4602 977/932 |
| 2011/0151189 A1 * | 6/2011 | Zhang | H05K 5/0243 428/142 |
| 2011/0215685 A1 * | 9/2011 | Jarvis | B32B 37/16 312/223.1 |
| 2012/0168339 A1 * | 7/2012 | Jan | B29C 45/0055 206/524.1 |
| 2012/0171399 A1 * | 7/2012 | Pai | B41M 7/0036 428/34.1 |
| 2012/0189818 A1 * | 7/2012 | Hayashi | H05K 3/4655 428/323 |
| 2012/0189826 A1 * | 7/2012 | Hayashi | H01L 23/49894 428/212 |
| 2013/0316169 A1 * | 11/2013 | Matsuda | B32B 5/145 428/221 |
| 2014/0100005 A1 * | 4/2014 | Bae | B29C 45/1418 455/575.8 |

(Continued)

*Primary Examiner* — Justin Y Lee
(74) *Attorney, Agent, or Firm* — MARSHALL, GERSTEIN & BORUN LLP; Michael P. Furmanek (57) ABSTRACT

A protective case for electronic equipment has a decorative layer, a functional layer, and a magnetic component inserted into the functional layer. A coating applied to the functional layer retains the magnetic component during removal of an electronic device or piece of equipment from the case. The functional layer may have a thickness that is substantially equivalent to the thickness of the magnetic component. A coating applied to the decorative layer may provide water resistance and prevent fingerprints on the case. Methods of fabricating a protective case for electronic equipment include a spraying method as well as a hot press forming method.

17 Claims, 7 Drawing Sheets

(56) References Cited

U.S. PATENT DOCUMENTS

| | | | | |
|---|---|---|---|---|
| 2014/0308869 A1* | 10/2014 | Seyboth | ................. | B32B 5/024 |
| | | | | 442/286 |
| 2015/0102970 A1* | 4/2015 | Yosui | ............... | G06K 19/07779 |
| | | | | 343/788 |
| 2016/0079657 A1* | 3/2016 | An | ...................... | H01Q 1/243 |
| | | | | 343/702 |
| 2016/0142522 A1* | 5/2016 | Kim | ..................... | A45C 11/00 |
| | | | | 455/575.8 |
| 2018/0346668 A1* | 12/2018 | Ichikawa | ............ | D06M 13/148 |
| 2019/0125048 A1* | 5/2019 | Altaras | ................ | H01F 7/0205 |
| 2019/0223311 A1* | 7/2019 | Shi | .................... | H04M 1/0202 |
| 2020/0299476 A1* | 9/2020 | Aizawa | ................... | C08J 5/042 |
| 2021/0195814 A1* | 6/2021 | Wu | ..................... | H05K 9/0081 |
| 2022/0046120 A1* | 2/2022 | Ji | ....................... | H04M 1/0249 |
| 2022/0094382 A1* | 3/2022 | Cole | ................... | H04B 1/3888 |
| 2022/0140852 A1* | 5/2022 | Zeng | ................. | A45C 13/1069 |
| | | | | 455/575.8 |
| 2023/0354538 A1* | 11/2023 | Jeon | ...................... | B32B 17/06 |
| 2023/0362290 A1* | 11/2023 | Guan | ................... | H04M 1/185 |
| 2024/0042709 A1* | 2/2024 | Zheng | .................. | B32B 37/10 |
| 2024/0137434 A1* | 4/2024 | Boterashevili | ......... | H04M 1/04 |

* cited by examiner

PROTECTIVE CASE FOR ELECTRONIC DEVICE

CROSS-REFERENCE TO RELATED APPLICATIONS

Priority is claimed to Chinese Patent Application No. 202311152026.3, filed on Sep. 7, 2023, the entire contents of which are hereby incorporated by referenced herein.

FIELD OF THE DISCLOSURE

The present disclosure generally relates to the technical field of electronic device protection and, in particular, to an electronic device protective case.

BACKGROUND

In order to facilitate magnetic charging, electronic equipment protective cases (e.g., cell phone cases) are increasingly embedded with magnetic pieces or components. Magnetic pieces have certain thickness, so in order to embed the magnetic pieces, a mobile phone case must have a certain thickness, which makes it difficult to make the mobile phone case thin.

One approach is to directly open a blind groove on the inner surface of the mobile phone case and to adhere the magnetic piece to the blind groove through glue or other methods. Although the mobile phone case made in this way looks thin and light, it can only be bent to a small extent because large scale bending will cause the exposed magnetic piece to be pushed out and fall out of the blind groove. Such as case does not meet the bending resistance performance required during the assembly process, or the installation or removal of the mobile phone case.

Additionally, in some methods of protective case fabrication, after the mobile phone case is embedded with a magnetic piece, a layer of flannel is attached, so that the magnetic piece will not fall out. However the use of a layer of flannel increases the thickness of the mobile phone case, causing it to look bulky. This choice of manufacturing is not the best choice for consumers desiring lighter and thinner mobile phone cases.

SUMMARY

Examples within the scope of the present disclosure are directed to a protective case for electronic equipment, particularly a protective case for a mobile phone that can be used with wireless charging technology. Such a protective case aims to prevent an exposed magnet piece or component being easily pushed out and falling off while having get a thin and aesthetically pleasing protective case.

By coating the outer surface of the decorative layer, it may be made waterproof and sweat-proof. Coating the surface of the functional layer not only prevents the magnet piece from being easily pushed out and detached due to exposure of the magnet piece, but also prevents the inner layer of a conventional mobile phone case being too thick. These coatings allow for a thin, light, and aesthetically pleasing electronic device protective case.

Examples within the scope of the present disclosure are directed toward an electronic device protective case that includes a decorative layer, a functional layer that is in contact with the decorative layer, a first coating on an outer surface of the decorative layer, and a second coating on an inner surface of the functional layer. In such an electronic device protective case, the decorative layer includes at least one layer of a first sheet material, and the functional layer includes at least one layer of a second sheet material and a magnetic piece. The second sheet material has a mounting hole, and the magnetic piece is embedded in the mounting hole. The thickness of the magnetic piece matches a depth of the mounting hole. The first coating, which is on the outer surface of the decorative layer, is applied by spraying a surface treatment agent. The second coating that is on the inner surface of the functional layer is formed of at least one of polyester, polyethylene, polypropylene, and epoxy materials.

In an approach, the first coating has a thickness that ranges from 0.01 mm to 0.10 mm and the second coating has a thickness that ranges from 0.05 mm to 0.28 mm. In such an approach, the electronic device protective case is made by a hot pressing method. The hot pressing method includes: bonding the first sheet material of the decorative layer, the second sheet material of the functional layer and the magnetic piece together by hot pressing to form a semi-finished product; preparing a hot pressing mold; placing the semi-finished product in a female portion of the hot pressing mold with the functional layer facing up; coating an inner surface of the functional layer evenly with at least one of polyester coating and epoxy coating; heat curing the semi-finished product; rotating the semi-finished product so that the functional layer is in contact with a male portion of the hot pressing mold, such that the decorative layer is facing upward; evenly spraying paint on the decorative layer; placing the semi-finished product in an environment of 80-100° C., applying 0.2-2.0 MPa of pressure on the semi-finished product, heating for 30-120 min; and taking out the semi-finished product after cooling.

In another approach, the thickness of the first coating ranges from 0.02 mm to 0.10 mm, and the thickness of the second coating ranges from 0.10 mm to 0.28 mm, and the electronic device protective case is made by a method that includes: cutting out a first coating and a second coating of appropriate shapes; combining the first coating, the at least one layer of first sheet material of the decorative layer above the first coating, the at least one layer of second sheet material of the functional layer above the first sheet material of the decorative layer, a magnetic piece inlaid in the functional layer, and the second coating above the decorative layer to form a semi-finished product; placing the semi-finished product in an environment of a predetermined temperature, applying a predetermined pressure on the semi-finished product, and heating for a predetermined heating time; and taking out the semi-finished product after cooling. In such an approach, the second coating is an epoxy thin film and the predetermined temperature ranges from 100° C. to 250° C., the predetermined pressure ranges from 0.5 to 2.0 MPa, and the predetermine heating time ranges from 60 to 180 minutes.

In another approach, the first sheet material of the decorative layer is an artificial fiber sheet pre-impregnated with resin or natural fiber sheet, the thickness of the first sheet material of each layer is 0.10 mm-0.40 mm; the second sheet material is an artificial fiber sheet pre-impregnated with resin, and the functional layer includes at least two layers of artificial fiber sheets, each layer of the second sheet material has a thickness of 0.1 mm-0.3 mm.

In any of the above approaches, the decorative layer includes a back plate and a side frame formed by an edge of the back plate, the edge of the back plate extends inwardly to form the side frame; and the edge of the functional layer and the edge of the side frame are evenly aligned; or the edge of the functional layer and the edge of the back plate are evenly aligned; or the edge of the second coating and the edge of the side frame are evenly aligned, or the edge of the second coating and the edge of the back plate are evenly aligned. In such approaches, wherein when the decorative layer is one layer of the first sheet, the edge of at least one of the functional layer and the second coating is evenly aligned with the edge of the side frame. Alternatively, in such approaches, when the decorative layer is at least two layers of the first sheet, the edges of the functional layer and the second coating are evenly aligned with the edge of the back plate.

In some approaches, the surfaces of the first coating and the second coating are smooth. Additionally, or alternatively, in some approaches the first sheet is made up of an opaque material, at least one layer of the second sheet is made of an opaque material, and the first coating and the second coating are made of translucent, transparent, or semi-transparent material.

Examples in this disclosure may be directed to a method of making an electronic device protective case. The method includes: cutting out a first coating and a second coating of appropriate shapes; combining the first coating, a first sheet of a decorative layer above the first coating, a second sheet of a functional layer above the first sheet of the decorative layer, a magnetic piece inlaid in the functional layer, and the second coating above the decorative layer to form a semi-finished product; placing the semi-finished product in an environment of a predetermined temperature, applying a predetermined pressure on the semi-finished product, and heating for a predetermined heating time; and taking out the semi-finished product after cooling. The first sheet of the decorative layer may include at least one layer of a first sheet material. The second sheet of the functional layer may include at least one layer of a second sheet material.

In an approach, the thickness of the first coating is 0.02-0.1 mm, and the thickness of the second coating is 0.1-0.28 mm. In an approach, the second coating is an epoxy thin film. Additionally, in an approach, the predetermined temperature range is 100-250° C., the predetermined pressure range is 0.5-2.0 MPa, and the predetermined heating time is 60-180 minutes. In an approach, the predetermined temperature range is 100° C. to 250° C. In an approach, the predetermined pressure range is 0.5 MPa to 2.0 MPa. In an approach, the predetermined heating time ranges from 1 to 180 minutes.

Examples in this disclosure may also be directed to a method of making an electronic device protective case in which the method includes: bonding a first sheet of a decorative layer, a second sheet of a functional layer and a magnetic piece together by hot pressing to form a semi-finished product; preparing a hot pressing mold; placing the semi-finished product in a female portion of the hot pressing mold with the functional layer facing up; coating an inner surface of the functional layer evenly with at least one of polyester coating and epoxy coating; heat curing the semi-finished product; rotating the semi-finished product so that the functional layer is in contact with a male portion of the hot pressing mold, such that the decorative layer is facing upward; evenly spraying paint on the decorative layer; placing the semi-finished product in an environment of a predetermined temperature, applying a predetermined pressure on the semi-finished product, heating for a predetermined time; and taking out the semi-finished product after cooling.

In an approach, the paint includes an oil based paint or a water-based paint. In an approach, the predetermined temperature ranges from 80° C. to 100° C. In an approach, the predetermined pressure ranges from 0.2 to 2.0 MPa. In an approach, the predetermined time ranges from 30 to 120 minutes.

BRIEF DESCRIPTION OF THE DRAWINGS

The above needs are at least partially met through provision of one, more than one, or any combination of the approaches for systems for containing and dispensing a cosmetic product described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples. Also, common but well-understood elements that are useful or necessary in a commercially feasible examples are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various approaches, a case for protecting an electronic device is provided that is thin, light, and aesthetically pleasing. In some examples, the protective case may be waterproof and sweat-proof due to an outer coating on a decorative layer, as well as having a reduced overall thickness of the case and retaining a magnetic component in the case during insertion and removal of an electronic device by coating a functional layer, all which having the protective case be light and aesthetically pleasing. Methods of making such a protective case for an electronic device are also provided herein.

Summary of the reference numbers: 100—smart phone protective case, D—decorative layer, F—functional layer, 1—first sheet (part of the decorative layer), C1—first coating film, 2—second sheet (part of the functional layer), 20—mounting hole, 3—second coating film, 4—magnetic piece (e.g., component), 5—back plate, 6—side frame, 7—avoidance hole, 8—camera ring.

Figure 1A:
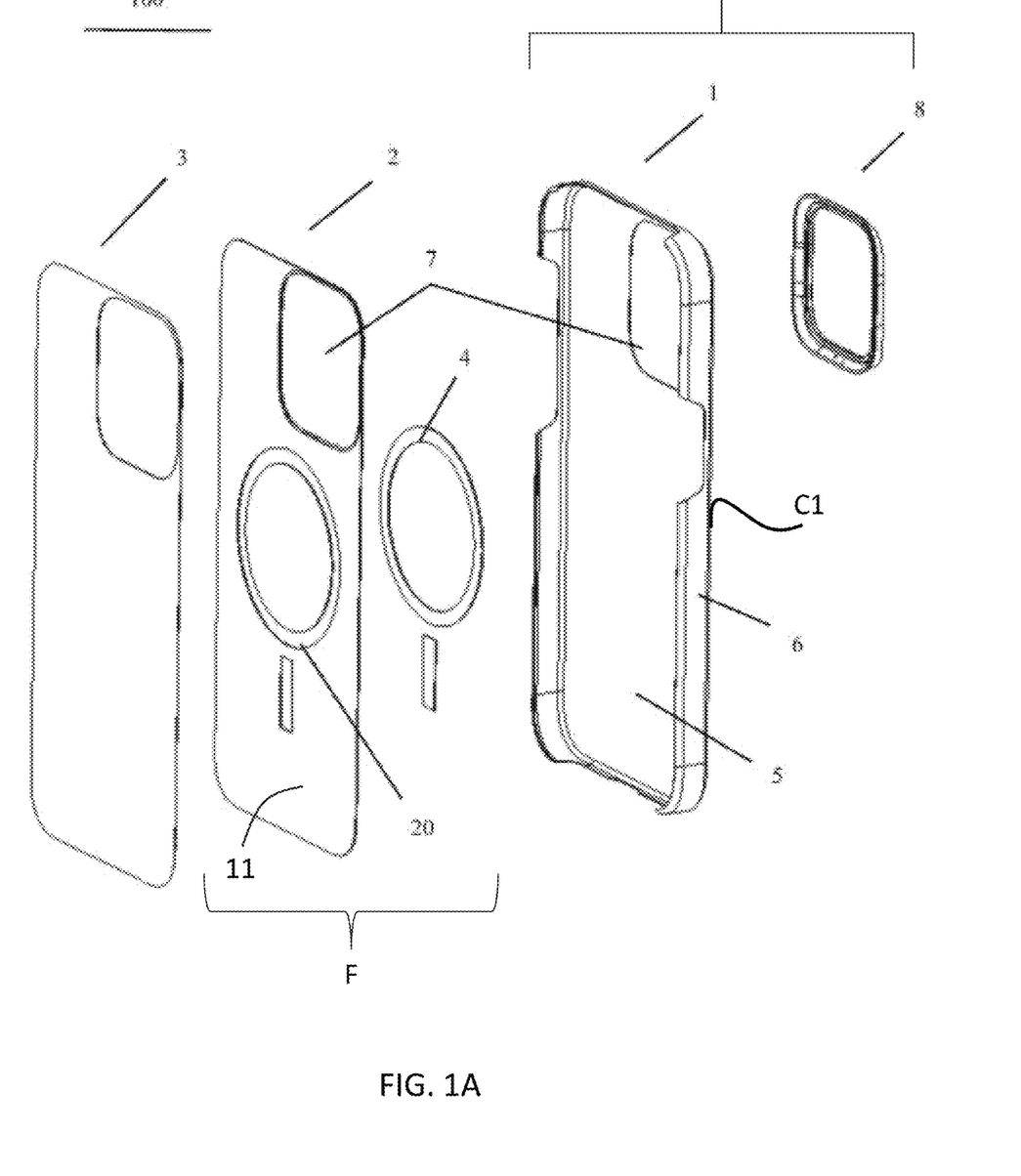
FIG. 1A illustrates an exploded view of an example electronic device protective case in accordance with various examples.
Figure 1B:
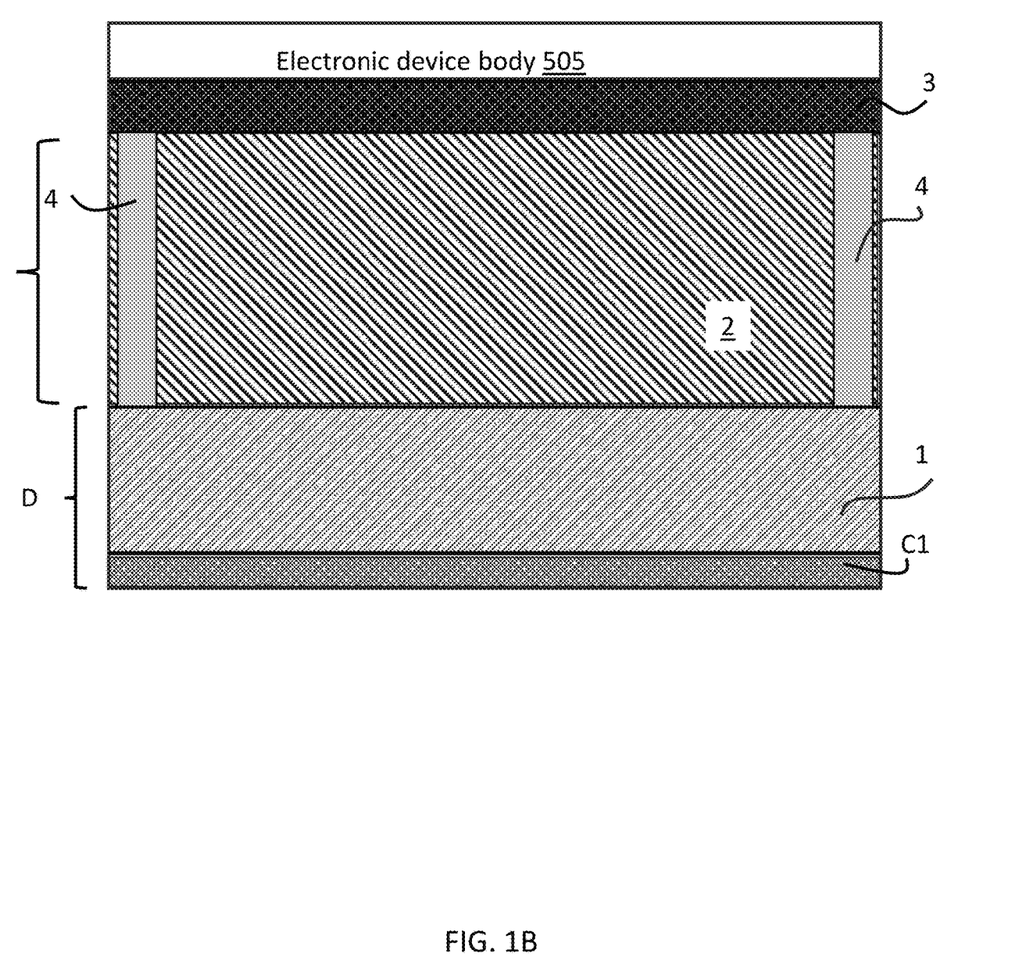
FIG. 1B illustrates a cross-sectional view of the example electronic device protective case of FIG. 1A in accordance with various examples.

FIGS. 1A and 1B show an electronic device protective case, specifically a smart phone protective case (100), including from outside to inside a decorative layer (D) and a functional layer (F), wherein the decorative layer (D) includes at least one layer of a first sheet (1); the functional layer (F) includes at least one layer of second sheet (2) and a magnetic piece or component (4). The second sheet (2) includes a mounting hole (20). The magnetic piece (4) is embedded in the mounting hole (20), and the depth of the mounting hole (20) matches the thickness of the magnetic piece (4).

The outer surface of the decorative layer (D), which is the outer surface of the first sheet (1), may have a first coating (C1). The first coating (C1) may be obtained by spraying a surface treatment agent. By coating the outer surface of the decorative layer, the outer surface may be made waterproof and sweat-proof.

The inner surface (11) of the functional layer (F), which is the inner layer of the second sheet (2), is in contact with the second coating (3). The second coating (3) completely covers the mounting hole (20) and, in the version depicted, substantially completely covers the inner surface (11) of the functional layer (F). The second coating (3) is translucent, transparent, or semi-transparent in some versions, and may be made of at least one of polyester thin film, polyethylene film, polypropylene film, epoxy film, and any polymer film which can be created using spray coating technology, heat pressing, or coating or deposition techniques.

By coating the functional layer (F) with the second coating (3), the magnetic component (4) is prevented from easily being pushed out and detached due to the exposure of the magnetic component to the interface of the case with an electronic device. Additionally, such a coating of the functional layer (F) prevents the inner layer of the conventional mobile phone case from being too thick, and allows a thin, light, and aesthetically pleasing electronic device protective case to be obtained.

The material of the first coating (C1) may be any suitable surface treatment capable of achieving functions such as waterproof and sweatproof, anti-fingerprint, anti-scratch, and improved appearance, including an oily or water-based surface treatment agent such as oil based paint, hydrophobic paint, anti-fingerprint paint.

FIG. 1B shows a schematic of a cross-section of the electronic device protective case (100) shown in FIG. 1A. In FIG. 1B, a portion of an electronic device body (505) is shown adjacent to the protective case (100), the figure is representative of when the protective case (100) is in use. Adjacent to the electronic device body (505), is the second coating (3). The functional layer (F) is shown adjacent to or sandwiched between the second coating (3) and the decorative layer (D). The functional layer (F) includes the second sheet (2) and the magnetic component (4) fitted into the mounting hole (20), as shown in FIG. 1A. The decorative layer (D) includes the first sheet (1) and the first coating (C1).

To manufacture the electronic device protective case, a coating plus spraying method can be used, such as a spray-painting method. Alternatively, or additionally, a hot press forming method can be used during manufacturing.

The spray coating method may include a spray-painting method including any of the following: air-atomized spray painting; airless spray painting; electrostatic spray painting; high-volume, low-pressure spray painting; and any combination thereof. The type of atomizer used in the spray coating method may include a spray nozzle and/or an ultrasonic atomizer. In some implementations, the spray coating method may be an additive one in which multiple types of spraying methods and/or materials are used. The spray coating method or process may be simpler and the cost is lower than other methods, such as hot pressing. Because inner and outer surfaces do not include too many grooves, gaps, protrusions and other similar structures, spray coating or spray painting is a suitable method for coating the inner and outer surfaces of smart phone cases. However, for shapes or configurations with many fine structures, it would not be easy to apply an evenly sprayed coating. When compared with directly applying film materials (e.g., using adhesive), this process may also allow for more flexible thickness control.

The coating plus spraying method may be used to prepare the first coating (C1) and the second coating (3) in some implementations. The spray coating method (e.g., coating plus spraying method) may be able to achieve a well-controlled coating thickness. The thickness of the first coating (C1) may range from about 0.01 mm to about 0.2 mm, such as from about 0.01 mm to about 0.15 mm, including from about 0.01 mm to about 0.1 mm. The thickness of the second coating (3) may range from about 0.01 mm to about 0.40 mm, such as from about 0.03 mm to about 0.3 mm, including from 0.05 mm to about 0.28 mm.

The second coating (3) may be formed of polyester film, preferably, the second coating (3) may be formed of thermoplastic polyurethane (TPU). TPU has flexible characteristic at room temperature after curing, the use of TPU can bring the following effects: (I) Because TPU is flexible, it can allow a certain degree of compression after the electronic equipment protective case is assembled, reducing the accuracy requirements for the thickness of the protective case. (II) TPU is soft and could absorb impact energy, thereby providing additional protection for the electronic device placed in the protective case.

The magnetic component (4) includes multiple magnet blocks. The magnetic component (4) may be placed on a polyimide film (PI film). The PI film may fit between the magnetic component (4) and the first sheet (1). In the assembled protective case for electronic device, one surface of the PI film is attached to the magnetic member (4), the other surface of the PI film is attached to the first sheet (1). The use of PI film can increase compatibility, prevent bubbles or hollows between the magnetic component (4) and the first sheet (1), and make the electronic device protective case smooth and flat. The size of the PI film can be designed to be slightly wider than the magnetic component (4). For example, the edge of the PI film protrudes from the outer edge of the magnetic component (4) by at least 1 mm. The PI film can also be dyed with black dye. After placing the magnetic component (4) on the dyed PI film, the PI film can cover the gaps between the magnetic blocks of the magnetic component (4) to improve the light-shielding effect, thereby avoiding light leakage at the location of magnetic component (4) in the electronic device protective case.

Figure 2:
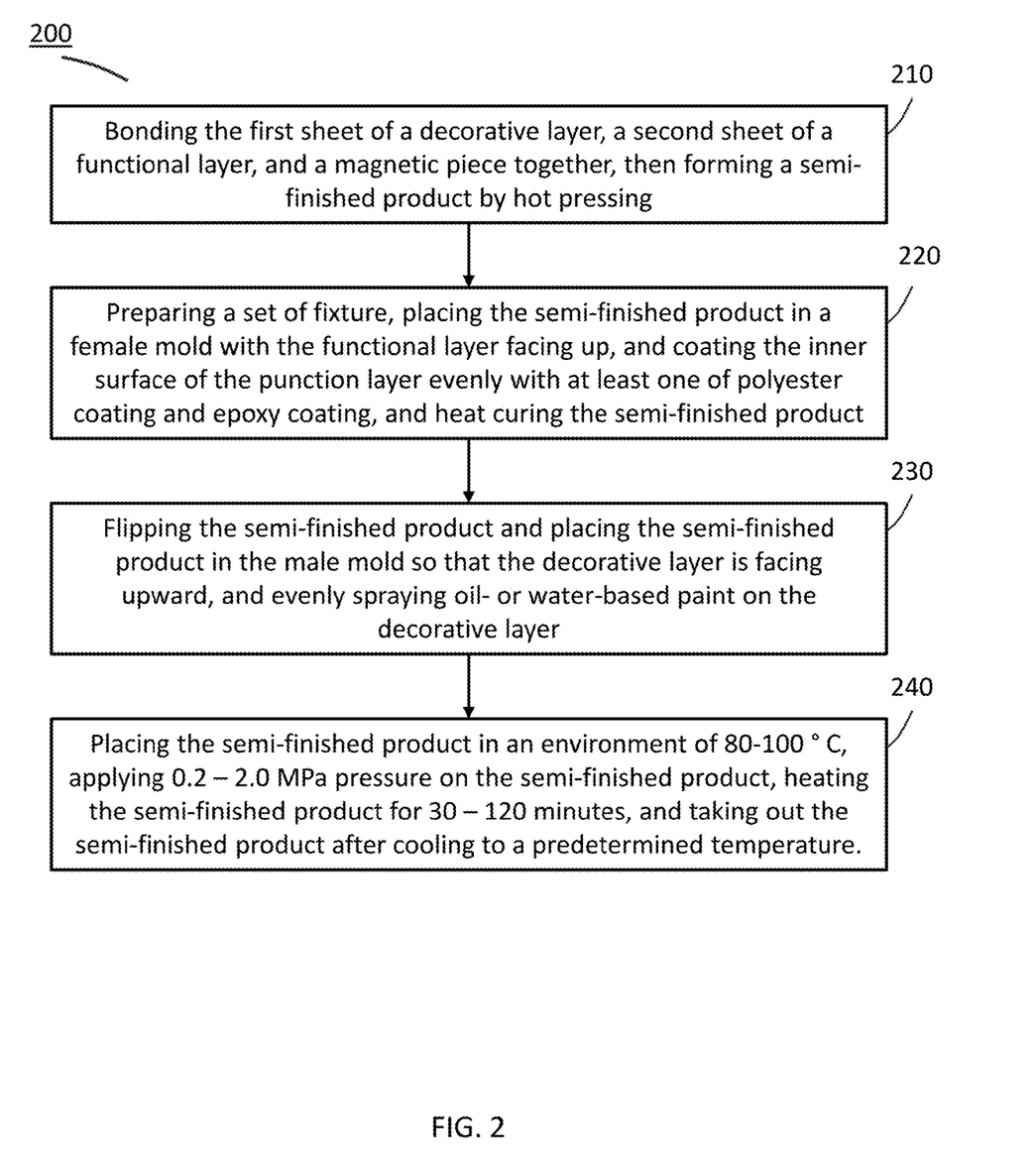
FIG. 2 shows a manufacturing method of an example electronic device protective case in accordance with various examples.

As shown in FIG. 2, the electronic device protective shell (100) may be constructed by a method (200) that includes the following steps.

In step 210, the method (200) includes bonding the first sheet (1) of the decorative layer (D), the second sheet of the functional layer (2) and the magnetic piece (4) together, and then forming a semi-finished product by hot pressing.

In step 220, the method (200) includes placing the semi-finished product in a female portion of a product mold with the functional layer (F) facing up and then coating the inner surface (11) of the functional layer (F) evenly with a material to form the second coating (3), and heat curing the semi-finished product. The coating material applied to the inner surface (11) to form the second coating (3) may be at least one of a polyester coating and an epoxy coating or a combination thereof.

In step 230, the method (200) includes flipping, or rotating, the semi-finished product and placing the semi-finished product in a male portion of a product mold so that the decorative layer (D) is facing upward, and evenly spraying a material on the decorative layer (D) to from the first coating (C1). The material sprayed on the decorative layer (D) may include oil- or water-based paint.

In step 240, the method (200) includes placing the semi-finished product in an environment of a predetermined temperature range and applying pressure in a predetermined range on the semi-finished product, heating the semi-finished products for a predetermined amount of time, then taking out the semi-finished product after cooling. The predetermined temperature range may be from about 70° C. to about 120° C., such as about 75° C. to about 110, including about 80° C. to about 100° C. The predetermined pressure may range from about 0.1 MPa to about 2.1 MPa, such as from about 0.15 MPa to about 2.05 MPa, including from about 0.2 MPa to about 2.0 MPa pressure on the semi-finished product. The predetermined temperature used for heating the semi-finished product while at the predetermined pressure may range from about 20 minutes to about 130 minutes, such as from about 25 minutes to about 125 minutes, including from about 30 minutes to about 120 minutes. Taking out the semi-finished product after cooling may including waiting until the semi-finished product reaches a predetermine temperature before removing it from the mold, such as waiting until the semi-finished product reaches ambient room temperature, or waiting until the semi-finished product reaches about 30° C. or below.

For the hot press forming method, the thickness of the first coating (C1) may range from about 0.01 mm to about 0.15 mm, including from about 0.02 mm to about 0.10 mm. When using this same method, the thickness of the second coating (3) may range from about 0.08 mm to about 0.30 mm, including from about 0.1 mm to about 0.28 mm. Using the hot pressing forming method to prepare the first coating (C1) and the second coating (3) is suitable when the inner and outer surfaces of the electronic device protective case have irregular or fine structures, such as concave, grooves, gaps, protrusions, and the like. The ability to apply high pressure with accuracy in high-temperature environments allows the first coating (C1) and the second coating (3) cover these irregular or fine structures well, without paint peeling, bubble forming, and/or bulging.

Figure 3:
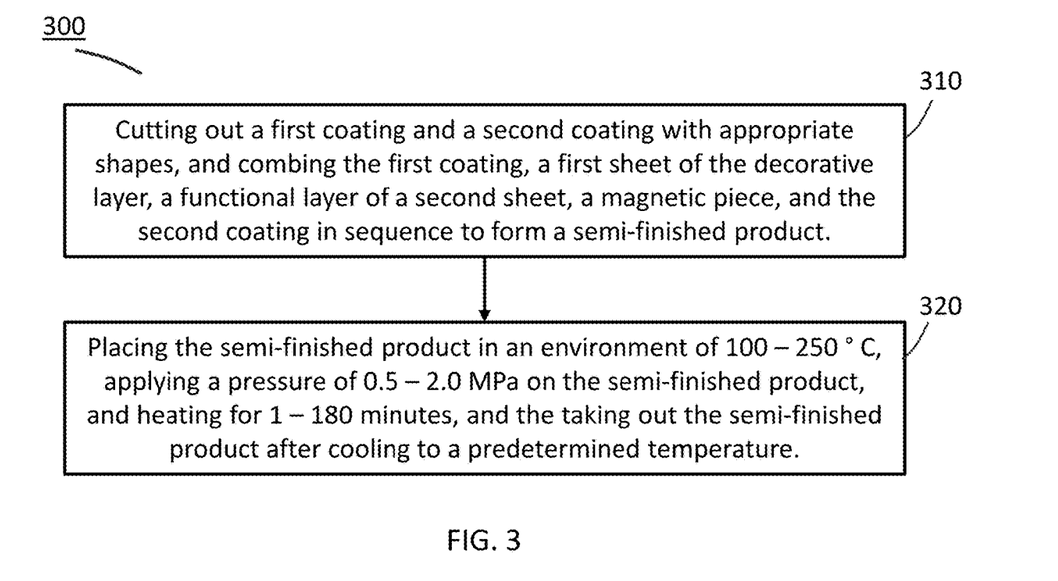
FIG. 3 shows another manufacturing method of an example electronic device protective case in accordance with various examples.

An electronic equipment protective case (100) may be fabricated using the hot press molding method (300) shown in FIG. 3.

In step 310, the method (300) includes cutting out the first coating (C1) and the second coating (3) with appropriate shapes, and combining the first coating (C1), the first sheet (1) of the decorative layer (D), the second sheet (2) of the function layer (F), the magnetic piece (4) and the second coating (3) in that sequence to form a semi-finished product.

In step 320, the method (300) includes placing the semi-finished product in an environment of a predetermined temperature, applying a predetermined pressure on the semi-finished product, and heating for a predetermined number of minutes, then taking out the semi-finished product after cooling. The predetermined temperature may range from about 80° C. to about 275° C., such as from about 90° C. to about 260° C., including from about 100° C. to about 250° C. The predetermined pressure may range from about 0.04 MPa to about 2.5 MPa, including from about 0.5 MPa to about 2.0 MPa. The predetermined number of minutes may range from about 1 minute to about 180 minutes.

Further, in some implementations, depending on the material, the heating time in step 320 can range from 1 minute to about 5 minutes. When using the hot pressing fabrication method to create the first coating (C1) and the second coating (3), the second coating (3) may preferably be an epoxy film. When the second coating (3) is an epoxy film, the step 320 of the method may specifically include: placing the semi-finished product in an environment with a temperature ranging from about 100° C. to about 250° C., apply pressure ranging from about 0.5 MPa to about 2.0 MPa on the semi-finished product, heating for about 60 minutes to about 180 minutes, and taking out the semi-finished product after cooling.

The first sheet (1) may include an artificial fiber sheet (e.g., a sheet that includes one or more synthetic fibers) that is pre-impregnated with resin. Additionally, or alternatively, the first sheet (1) may include a natural fiber sheet. The thickness of the first sheet (1) of each layer may range from about 0.05 mm to about 0.5 mm, including from about 0.1 mm to about 0.4 mm. In some examples, the first sheet (1) may include a pre-impregnated aramid fiber sheet with a thickness ranging from about 0.25 mm to about 0.35 mm. In some examples, the first sheet (1) may include a pre-impregnated hemp fiber sheet with a thickness ranging from about 0.3 mm to about 0.4 mm. In producing protective cases for electronic devices, artificial fiber materials have properties that can be superior to ordinary polycarbonate (PC) and soft rubber materials. The advantageous materials properties of artificial fibers include low density, low weight, high strength, high modulus, as well as acid and alkali resistance. Using artificial fibers to fabricate the first sheet (1), may make the decorative layer stronger, wear-resistant, lighter, and thinner. Using natural fiber materials to fabricate the first sheet (1) would be more environmentally friendly. Whether synthetic fiber or natural fiber is used to make the first sheet (1), the fiber texture may look more fashionable.

Further, the second sheet (2) may be an artificial fiber sheet pre-impregnated with resin, and the functional layer may include at least two layers of artificial fiber sheets, and each layer of the second sheet (2) may have a thickness of about 0.1 mm to about 0.3 mm. An artificial fiber sheet may be light and thin, and by choosing to stack more than two layers of artificial fiber sheets, and then provide mounting holes (20), a depth equivalent to the thickness of the magnetic piece (4) may be obtained. Matching the thickness of the magnetic piece (4) and the depth of the mounting hole (20) can make the surface of the functional layer smooth and avoid leaving marks on the decorative layer (D) during the hot pressing process due to due to the height difference between the second sheet (2) and the magnetic piece (4).

Specifically, the type of material used for the second sheet (2) and the thickness of the second sheet (2) may be selected to accommodate the thickness of the magnetic piece (4). In some examples, the thickness of the magnetic piece may be about 0.35 mm, and the second sheet (2) can be formed by stacking and pressing a layer of glass fiber sheet pre-impregnated with resin and a layer of aramid fiber sheet pre-impregnated with resin. The second sheet (2) may have a thickness of 0.35±0.2 mm. In this example, holes can be made in the second sheet to form the mounting hole (20), and the depth of the mounting hole (20) matches the thickness of the magnetic piece (4). Alternatively, in some examples, the second sheet (2) can also be made up of four layers of fiberglass sheets pre-impregnated with resin. When the four layers of fiberglass sheets are stacked and pressed, the second sheet (2) may have a thickness of 0.4±0.2 mm, and in this example, a blind hole with a depth of 35 mm is opened up in the second sheet (2) and is used as the mounting hole (20). As in the other example, the depth of the mounting hole (20) matches the thickness of the magnetic piece (4). The structural strength requirements of the entire smartphone protective case (100) will also be considered when making decisions regarding the selection of material types, thicknesses, and number of layers for the second sheet (2).

Further, as shown in FIG. 1A, the decorative layer (D) includes a back plate (5) and a side frame (6) formed by inwardly extending from edge of the back plate (5). The back plate (5) and the second sheet (2) are both provided with avoidance holes (7) and equipped with a camera ring (8). In some examples of an electronic device protective case, the edge of the functional layer is evenly aligned with the edge of the side frame (6). In other examples, the edge of the functional layer (F) is evenly aligned with the edge of the back panel (5). Alternatively, or additionally, the edge of the second coating (3) may be evenly aligned with the edge of the side frame (6). Alternatively, the edge of the second covering film (3) may be evenly aligned with the edge of the back panel (5). The structural strength of the smart phone protective case (100) may be improved by altering the materials and/or configurations of the side frame (6), second covering film (3), and back panel (5).

Figure 4A:
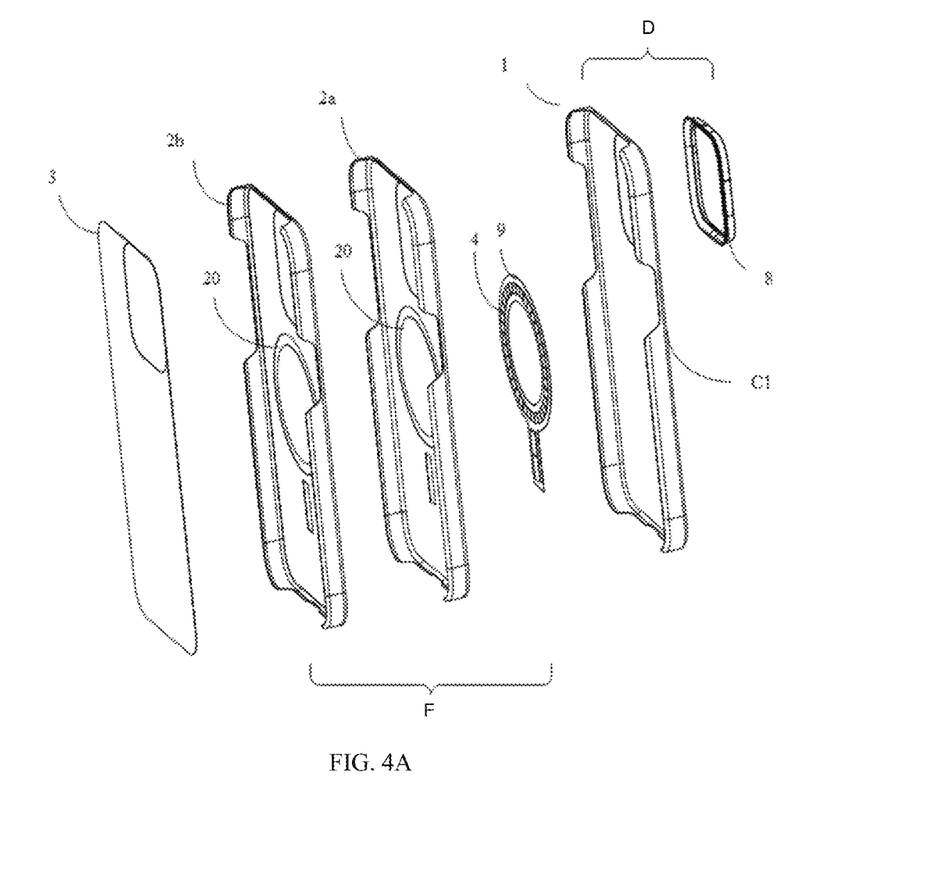
FIG. 4A illustrates an exploded view of another example electronic device protective case in accordance with various examples.
Figure 4B:
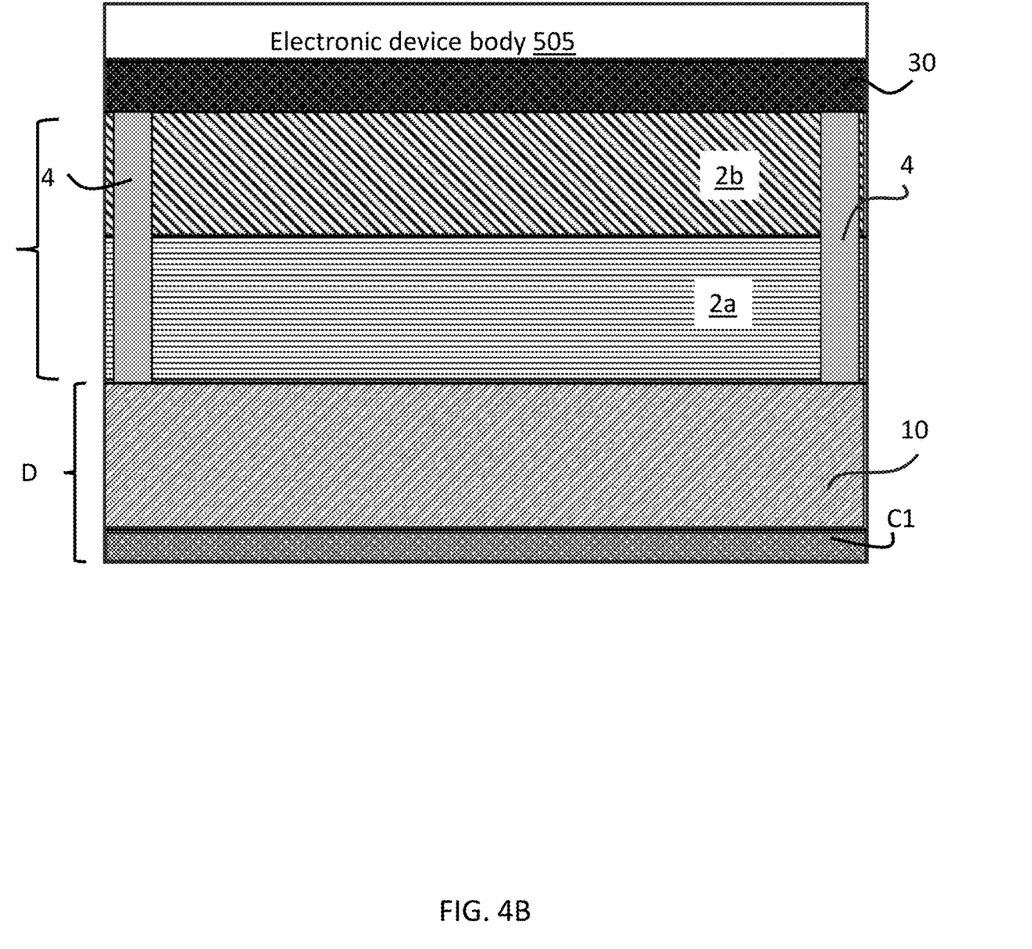
FIG. 4B illustrates a cross-sectional view of the example electronic device protective case of FIG. 4A in accordance with various examples.

FIG. 4A shows an exploded view of another example of an electronic device protective case. FIG. 4B shows a cross section of a portion of the electronic device protective case shown in FIG. 4A. Shown in FIG. 4B is an electronic device body 505 adjacent to an electronic device protective case. The case has a decorative layer (D) and a functional layer (F). The decorative layer (D) includes a first coating (C1) and a first sheet (1). The first sheet (1) may be a first layer as described herein above, including an aramid fiber impregnated with epoxy resin. The first coating (C1) may also be like that described above, that is either cut from a layer or sprayed onto the first sheet (1) of the decorative layer (D). The functional layer (F) includes a magnetic piece (4) which is imbedded in a mounting hole (20). The functional layer (F) also has an interlayer of fabric (2a) and an interlayer of fiberglass (2b). The electronic device protective case also has a fiberglass lining layer (3) that is adjacent to the electronic device body (505) when the electronic device protective case is in use.

In some examples, the electronic device protective case shown in FIGS. 4A and 4B may have a decorative layer (D) that includes aramid fiber and epoxy resin. Additionally, or alternately, the fiberglass lining layer (3) may be a woven sheet of fiber glass impregnated with epoxy resin. The fiber glass lining layer (3) may include A-glass (alkali glass), C-glass (chemical glass), S-glass (structural glass), E-glass (electrical glass), or any suitable combination thereof. In addition to being a woven glass mat, the fiber glass lining layer (3) may include a chopped strand mat. The interlayer fabric (2a) in some examples may include an aramid fiber sheet impregnated with epoxy resin. Alternatively, or additionally, the interlayer fabric (2a) may include any suitable fiberglass or polymer fiber of suitable strength in torsion and compression as well as other desirable materials and/or mechanical characteristics such as shock absorption, temperature tolerance, and the like. The interlayer of fiberglass (2b) may be made of fiberglass impregnated with epoxy resin in some examples. The interlayer of fiberglass (2b) and the fiberglass lining (3) may be similar in composition, or they may be distinct. The interlayer of fiberglass (2b) and the fiberglass lining (3) may have the same materials (e.g., C-glass, E-glass, etc.) in different configurations or formats, such as different weaves or layups of the layers of fiber glass and including different densities of the fiberglass sheets. Further, the interlayer of fiberglass (2b) and the fiberglass lining (3) may utilize the same epoxy or distinct epoxy formulations.

The magnetic component (4) includes multiple magnet blocks. The magnetic component (4) may be placed on a polyimide film, PI film (9). The PI film (9) may fit between the magnetic component (4) and the first sheet (1).

Figure 5:
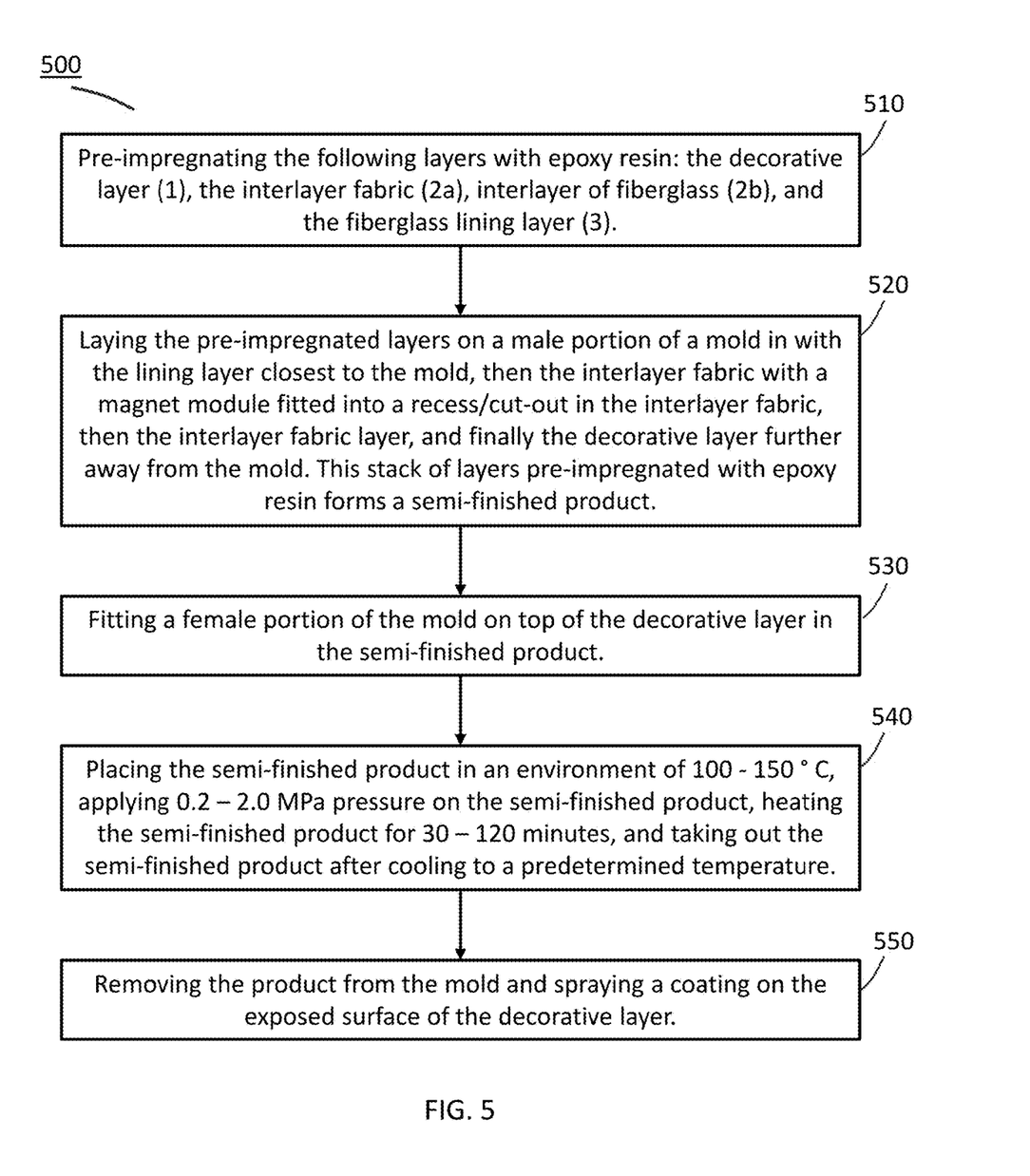
FIG. 5 shows a another manufacturing method of an example electronic device protective case in accordance with various examples.

FIG. 5 shows a method of making an electronic device protective case such as the example case shown in FIGS. 4A and 4B. In the example method (500) shown in FIG. 5, the following layers are pre-impregnated with epoxy resin: the decorative layer (1), the interlayer fabric (2a), interlayer of fiberglass (2b), and the fiberglass lining layer (3) as in step 510. Step 520 includes laying the pre-impregnated layers on a male portion of a mold in with the lining layer closest to the mold, then the interlayer fabric with a magnet module fitted into a recess/cut-out in the interlayer fabric, then the interlayer fabric layer, and finally the decorative layer further away from the mold. In this way, the magnetic piece or magnet module is inlaid into the functional layer. This stack of layers, pre-impregnated with epoxy resin, forms a semi-finished product. The following step, step 530 may include fitting a female portion of the mold on top of the decorative layer in the semi-finished product. Placing the semi-finished product in an environment of about 100° C. to about 150° C., applying about 0.2 MPa to about 2.0 MPa pressure on the semi-finished product, heating the semi-finished product for about 30 minutes to about 120 minutes, and taking out the semi-finished product after cooling to a predetermined temperature may be part of the next step 540. Finally, as in step 550, the method may include removing the product from the mold and spraying a coating on the exposed surface of the decorative layer. The temperature, pressure, and time ranges described with respect to this example method may be approximate values, such that the environment in which the semi-finished product is placed may range from about 90° C. to about 200° C., such as from about 100° C. to about 175° C., including from about 100° C. to about 150° C. Further the pressure applied may range from about 0.10 MPa to about 2.50 MPa, such as about 0.15 MPa to about 2.25 MPa, including from about 0.10 MPa to about 2.00 MPa. Additionally, the time during which the heat is applied to the semi-finished product may range from about 20 minutes to about 180 minutes, such as from about 25 minutes to about 160 minutes, including from about 30 minutes to about 120 minutes.

Two examples of electronic device protection cases are provided below.

Example 1

The decorative layer (D) includes a layer of the first sheet (1). The functional layer (F) and the second coating (3) are aligned such that one edge of the functional layer and the second coating are evenly aligned with the edge of the side frame (6). A factor to consider in this example is that one layer of the first sheet (1) may be lighter and thinner, and in turn the side frame (6) is relatively fragile. In order to improve the structural strength and firmness during assembly of the case, a layer of second sheet (2) and/or the second coating (3) in the functional layer can be extended to the edge of the side frame (6). Preferably, the thickness of the back plate (5) is about 0.2 mm to about 0.4 mm, the thickness of the second coating (3) is about 0.05 mm to about 0.28 mm, thereby strengthening the overall structural strength.

Example 2

The decorative layer (D) includes a first sheet (1) that includes at least two layers. The edges of the functional layer (F) and second coating (3) are all evenly aligned. A factor to consider is that at least two layers of the first sheet (1) can improve the structural strength of the side frame (6), and also improve the firmness of the case during assembly, there is no need to extend the second sheet (2) or the second coating (3) to the side frame (6) in this example. Preferably, the thickness of the first sheet (1) is about 0.1 mm to about 0.25 mm and the first sheet (1) can be composed of two different types of sheets with different thicknesses. Such a choice of materials and configuration of the layers may be capable of balancing the relationship between the thickness of the decorative layer (D) and the structural strength.

The surfaces of the first coating (C1) and the second coating (3) can be smooth surfaces or rough surfaces. The first coating (C1) and the second coating (3) may be made of light-transmitting or semi-light-transmitting material, while the first sheet (1) may be made of opaque material. At least one layer of the second sheet (2) may be made of opaque material. Combined with the light-transmitting properties (e.g., transparency or semi-transparency) of the second coating (3), consumers can intuitively see the internal magnetic parts (4) through the second coating (3). For a technical and fashionable experience, a glossy surface on either, or both, the first coating (C1) or the second coating (3) can enhance the mirror feel, while a rough surface can enhance the feel.

More preferably, the smart phone protective case (100) may have at least two layers of sheets of opaque material, for example, the first layer of the first sheet (1) and the outermost layer of the second sheet (2) may both be made of opaque material, and this can prevent the corners of the phone case from transmitting light which may cause cosmetic defects.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The patent claims at the end of this patent application are not intended to be construed under 35 U.S.C. § 112 (f) unless traditional means-plus-function language is expressly recited, such as "means for" or "step for" language being explicitly recited in the claim(s).

What is claimed is:
1. An electronic device protective case, comprising:
a decorative layer including at least one layer of first sheet material; and
a functional layer that is in contact with the decorative layer, the functional layer
including at least one layer of second sheet material and a magnetic piece;
wherein:

the second sheet material is provided with a mounting hole;

the magnetic piece is embedded in the mounting hole; and the magnetic piece has a thickness that matches a depth of the mounting hole;

further wherein:

the decorative layer has an outer surface that is provided with a first coating;

the functional layer has an inner surface that is provided with a second coating, with the second coating completely covering the mounting hole; and the second coating is formed of at least one of polyester, polyethylene, polypropylene, or epoxy materials, and wherein the electronic device protective case further comprises either (i) or (ii):

(i) the first coating has a thickness that ranges from 0.01 mm to 0.10 mm; and the second coating has a thickness that ranges from 0.05 mm to 0.28 mm, and further wherein the electronic device protective case is made by a hot pressing method, the hot pressing method comprising:

bonding the first sheet material of the decorative layer, the second sheet material of the functional layer and the magnetic piece together by hot pressing to form a semi-finished product;

preparing a hot pressing mold;

placing the semi-finished product in a female portion of the hot pressing mold with the functional layer facing up;

coating an inner surface of the functional layer evenly with at least one of a polyester coating or an epoxy coating;

heat curing the semi-finished product;

rotating the semi-finished product so that the functional layer is in contact with a male portion of the hot pressing mold, such that the decorative layer is facing upward;

evenly spraying paint on the decorative layer;

placing the semi-finished product in an environment of 80-100° C., applying 0.2-2.0 MPa of pressure on the semi-finished product, heating for 30-120 min; and taking out the semi-finished product after cooling, or (ii) the thickness of the first coating ranges from 0.02 mm to 0.10 mm; and the thickness of the second coating ranges from 0.10 mm to 0.28 mm; and further wherein the electronic device protective case is made by a method comprising:

cutting out a first coating and a second coating of appropriate shapes;

combining the first coating, the at least one layer of first sheet of material of the decorative layer above the first coating, the at least one layer of second sheet of material of the functional layer above the first sheet material of the decorative layer, a magnetic piece inlaid in the functional layer, and the second coating above the decorative layer to form a semi-finished product;

placing the semi-finished product in an environment of a predetermined temperature, applying a predetermined pressure on the semi-finished product, and heating for a predetermined heating time; and taking out the semi-finished product after cooling.

2. The electronic device protective case according to claim 1, wherein the electronic device protective case further comprises (ii) and wherein the second coating is an epoxy thin film, and further wherein predetermined temperature ranges from 100° C. to 250° C., the predetermined pressure ranges from 0.5 MPa to 2.0 MPa, and the predetermined heating time ranges from 60 to 180 minutes.

3. The electronic device protective case according to claim 1, characterized in that the first sheet material is an artificial fiber sheet pre-impregnated with resin or natural fiber sheet, the thickness of the first sheet material of each layer is 0.1 mm-0.4 mm; the second sheet material is an artificial fiber sheet pre-impregnated with resin, and the functional layer includes at least two layers of artificial fiber sheets, each layer of the second sheet material has a thickness of 0.1 mm-0.3 mm.

4. The electronic device protective case according to claim 1, characterized in that the decorative layer includes a back plate and a side frame formed by an edge of the back plate, the edge of the back plate extends inwardly to form the side frame; and the edge of the functional layer and the edge of the side frame are evenly aligned; or the edge of the functional layer and the edge of the back plate are evenly aligned; or the edge of the second coating and the edge of the side frame are evenly aligned, or the edge of the second coating and the edge of the back plate are evenly aligned.

5. The electronic device protective case according to claim 4, wherein when the decorative layer is one layer of the first sheet material, the edge of at least one of the functional layer and the second coating is evenly aligned with the edge of the side frame.

6. The electronic device protective case according to claim 4, wherein when the decorative layer is at least two layers of the first sheet material, the edges of the functional layer and the second coating are evenly aligned with the edge of the back plate.

7. The electronic device protective case according to claim 1, wherein the second coating is formed of thermoplastic polyurethane.

8. The electronic device protective case according to claim 1, wherein:

the first sheet material is made up of an opaque material, at least one layer of the second sheet material is made of an opaque material, and the first coating and the second coating are made of translucent, transparent, or semi-transparent material.

9. The electronic device protective case according to claim 1, wherein the second coating completely covers the mounting hole and completely covers the inner surface of the functional layer, further wherein the second coating is formed of at least one of polyester, polyethylene, polypropylene, or epoxy materials.

10. An electronic device protective case, comprising:

a decorative layer including at least one layer of first sheet material; and a functional layer that is in contact with the decorative layer, the functional layer including at least one layer of second sheet material and a magnetic piece;

wherein:

the second sheet material is provided with a mounting hole;

the magnetic piece is embedded in the mounting hole; and the magnetic piece has a thickness that matches a depth of the mounting hole;

further wherein:

the decorative layer has an outer surface that is provided with a first coating, and the first coating is applied by spraying a surface treatment agent;

the functional layer has an inner surface that is provided with a second coating, with the second coating completely covering the mounting hole; and the second coating is formed of at least one of polyester, polyethylene, polypropylene, or epoxy materials, further wherein:

the first coating has a thickness that ranges from 0.01 mm to 0.10 mm; and the second coating has a thickness that ranges from 0.05 mm to 0.28 mm.

11. The electronic device protective case according to claim 10, characterized in that the first sheet material is an artificial fiber sheet pre-impregnated with resin or natural fiber sheet, the thickness of the first sheet material of each layer is 0.1 mm-0.4 mm; the second sheet material is an artificial fiber sheet pre-impregnated with resin, and the functional layer includes at least two layers of artificial fiber sheets, each layer of the second sheet material has a thickness of 0.1 mm-0.3 mm.

12. The electronic device protective case according to claim 10, characterized in that the decorative layer includes a back plate and a side frame formed by an edge of the back plate, the edge of the back plate extends inwardly to form the side frame; and the edge of the functional layer and the edge of the side frame are evenly aligned; or the edge of the functional layer and the edge of the back plate are evenly aligned; or the edge of the second coating and the edge of the side frame are evenly aligned, or the edge of the second coating and the edge of the back plate are evenly aligned.

13. The electronic device protective case according to claim 12, wherein when the decorative layer is one layer of the first sheet material, the edge of at least one of the functional layer or the second coating is evenly aligned with the edge of the side frame.

14. The electronic device protective case according to claim 12, wherein when the decorative layer is at least two layers of the first sheet material, the edges of the functional layer and the second coating are evenly aligned with the edge of the back plate.

15. The electronic device protective case according to claim 10, wherein the second coating is formed of thermoplastic polyurethane.

16. The electronic device protective case according to claim 10, wherein:

the first sheet material is made up of an opaque material, at least one layer of the second sheet material is made of an opaque material, and the first coating and the second coating are made of translucent, transparent, or semi-transparent material.

17. The electronic device protective case according to claim 10, wherein the second coating completely covers the mounting hole and completely covers the inner surface of the functional layer, further wherein the second coating is formed of at least one of polyester, polyethylene, polypropylene, or epoxy materials.

* * * * *